Patented Feb. 29, 1944

2,343,065

UNITED STATES PATENT OFFICE 2,343,065

EMULSIFIED WAX COMPOSITION AND METHOD OF PREPARATION

Ralph W. Kumler, Winchester, Mass., and Harold Sinclair, Canton, Ohio, assignors to Bennett Incorporated, Cambridge, Mass., a corporation of Massachusetts No Drawing. Continuation of application Serial No. 336,766, May 23, 1940. This application June 19, 1940, Serial No. 341,348

3 Claims. (Cl. 106—271)

This invention relates to an emulsified wax composition, such as is useful for sizing papermaking stock, and to the method of preparing such composition. It deals more especially with an aqueous wax emulsion stabilized by such stabilizer or protective colloid as is practically inert with respect to the alum customarily used for fixing the emulsified wax content on papermaking stock. The expressions "aqueous wax emulemulsion" and "emulsified wax composition" are used herein in a generic sense to include not only compositions containing an emulsified wax component but also those in which the wax component is compounded or modified with more or less rosin and/or other unsaponified thermoplastic sizing material, for instance, such compositions and stabilizers as are described in Neitzke Patent No. 2,198,289, dated April 23, 1940. This is a continuation of the co-pending application of Kumler and Sinclair, Serial No. 336,766, filed May 23, 1940, for Emulsified wax composition and method of preparation.

In using water-emulsified wax compositions of the foregoing character for sizing papermaking stock, it becomes possible to admix alum with such compositions before they are incorporated into the stock, since the alum does not sensibly precipitate or coarsen the emulsified particles and at the same time does serve to promote the desired ultimate fixation or retention of the particles by the stock. We have now found that for some purposes it is highly advantageous also to admix with such emulsified compositions a water-soluble salt capable of undergoing metathetical reaction with alum to form a water-insoluble aluminum salt. While such admixture and reaction may be effected in the papermaking stock, it is preferable to premix the emulsified wax composition with the alum and the appropriate water-soluble salt, particularly as the desired substantially uniform admixture may be more readily effected in the absence of the papermaking stock and as there is very little, if any, tendency to induce thereby an agglomerating or coarsening effect on the emulsified wax particles before they are disseminated throughout the papermaking stock even when the premixture is permitted to stand for a substantial period of time.

Various water-soluble salts, such as phosphates and silicates, may be used for the metathetical reaction with the alum, but it is preferable to employ sodium aluminate for such purpose. Thus, a given amount of sodium aluminate furnishes a maximum amount of precipitate in the form of the basic aluminum sulphate, since the aluminum content of both the aluminate and the alum are transformed into such precipitate. An important advantage of the emulsified wax composition hereof is that its emulsified wax content and its stabilizer remain substantially unaffected by the precipitating reaction therein, which yields a water-insoluble alum salt precipitate frequently of considerable value in making various kinds of paper and board products.

In such papermaking processes as involve the coating of papers or boards while they are still on the wet end of the papermaking machine, the emulsified wax compositions hereof have proved to be especially satisfactory in that they serve to minimize the consumption of aqueous coating composition necessary for developing a given or desired surface effect. It is evidently the case that the precipitated or water-insoluble aluminum salt present in the sizing composition hereof diminishes greatly the rate of penetrability of an aqueous coating composition into the body of a wet sheet that has already been body-sized with the sizing composition thereof. The aqueous coating composition may be applied to such wet sheet at a suitable stage of manufacture, for instance, after the sheet has undergone the last stage of pressing at the wet end of the papermaking machine. When presizing of the sheet is effected with a composition lacking the water-insoluble aluminum salt present in the composition hereof, an aqueous coating composition applied to the moist or still-undried sheet tends largely to penetrate into and be lost or dissipated in the body of the sheet, for the wax content of the sheet is evidently still present in practically the same fine discrete particle form as in the original emulsion and it is not until the sheet has been dried at elevated temperature that the wax particles therein are sufficiently fused and coalesced to impart to the sheet a water-repellent effect. These latter qualifications hold particularly true in the case of a wax emulsion wherein the emulsified wax particles are stabilized or protected by stabilizers or protective colloids practically inert with respect to alum in the sense that the alum has no appreciable effect on such emulsion insofar as concerns causing coalescence or coagulation of the wax particles even though it does function to promote retention of the particles by the fibers of papermaking stock for their final fusion and coalescence during the usual elevated temperature driving of the paper sheet. It is for such latter reason that, when such a wax emulsion is used in the sizing of papermaking stock, it is preferable to subject the paper sheet to a drying operation at higher temperature and/or for a longer time period than usual in order to realize by fusion and coalescence of the wax particles practically the maximum water-repellent quality attainable in the sheet with a given wax usage.

We shall now describe an embodiment of our invention in terms of the preparation of a composition useful for the sizing of papermaking stock to be converted into a paper sheet or board and more particularly one to be coated while still traversing the wet end of the papermaking machine. It might be noted that the application of an aqueous coating composition to a still-wet paper sheet in the course of its manufacture is economical in that the need of a redrying operation, such as must be performed when the coating composition is applied to a predried or completely prefabricated paper sheet, is avoided. In preparing the composition hereof, one may start with an aqueous emulsion whose emulsified solids content consists essentially of paraffin wax and rosin, say, about 66% wax and about 34% rosin. The stabilizer, which may be a water-soluble gum, such as gum arabic, or the like, may be used in relatively small amount, say, about 3% to 10%, based on the dry weight of the emulsified mixture of wax and rosin; and such stabilizer may be substantially the only agency for stabilizing or preserving the wax-rosin mixture in the desired finely emulsified or particulate condition in the watery vehicle. We need not go into such further detail as may be incident to the preparation of the emulsion, which may readily be produced at relatively high solids content, say, about 40% to 50% solids content, in accordance with the disclosure of said Neitzke Patent No. 2,198,289. The concentrated emulsion may be diluted with water to, say, about 20% solids content and then admixed with, say, about 25% to 300% of alum, based on the emulsified wax-rosin solids content. Thereupon, sodium aluminate or other water-soluble salt may advantageously be added in amount somewhat or distinctly less than that constituting a substantially chemical equivalent of the amount of alum added, thereby ensuring the desired substantially complete reaction with, or consumption of, the sodium aluminate in precipitating basic aluminum sulphate and at the same time also furnishing an excess of alum such as conduces to the desired acidic condition in the sized papermaking stock and, accordingly, the desired fixation or retention of the wax-rosin sizing solids by the stock. It is thus seen that the composition hereof contains a substantial amount of free alum along with the water-insoluble aluminum salt precipitate.

The premixed aqueous composition hereof consisting essentially of wax-rosin emulsion containing precipitated therein basic aluminum sulphate or other water-insoluble aluminum salt and alum may then readily be commingled with the bulk papermaking stock, as in the beater engine; or it may be commingled as a continuous stream with a stream of papermaking stock on its way to the papermaking machine. Depending upon the particular paper or board product in view, various amounts of composition may be infused into the stock, say, an amount calculated to produce a finished product containing about 1% to 4% of the wax-rosin mixture along with such amount of water-insoluble aluminum salt precipitate as may be deemed most suitable for the particular product being fabricated, for instance, such amount as ensues from the reaction of about 25% to 300% of alum, based on the weight of the wax-rosin mixture, and somewhat or distinctly less than a chemically equivalent amount of sodium aluminate or other water-soluble salt capable of undergoing metathetical reaction with the alum to yield a water-insoluble aluminum salt.

While the paper sheet or board containing the sizing composition hereof is still in wet state on the papermaking machine, preferably immediately after it has passed through the last pair of press rolls in preparation for drying, it may advantageously be surface-coated with various aqueous coating compositions, such as those containing one or more of such adhesives as casein, starch, glue, latex, etc., and one or more of such fillers as clay, calcium carbonate, titanium dioxide, etc. Such aqueous coating composition may be applied in any suitable manner, for instance, as by a roll applicator, to the surface of the still-moist sheet. A significant characteristic of the still-moist sheet body-sized with the composition hereof is its capability of restraining or inhibiting penetration or diffusion into its body of the coating composition. Such capability is markedly greater than when the sheet is body-sized with a similar emulsified wax composition lacking a water-insoluble aluminum salt precipitate therein, wherefore, it becomes possible by the practice of the present invention to minimize consumption of surface-coating composition in realizing a given or desired surface effect on the sheet as well as to facilitate the subsequent drying of the sheet and to preserve to a greater extent such qualities as are desired in the body of the finished sheet. The drying of the coated sheet may be effected in the usual way, as by passing it over a series of steam-heated drier drums, which may be maintained sufficiently hot to foster the desired fusion and coalescence of the wax particles in the sheet and thus to enable the realization of substantially maximum water-repelling quality from such wax as has been incorporated into the sheet.

The metathetical reaction between the alum and the sodium aluminate may, if desired, be carried out in the wax emulsion after the emulsion has been incorporated into the papermaking stock, although this procedure is generally less satisfactory than when the reacting salts are premixed with the emulsion and the resulting composition containing the precipitated aluminum salt is then added to the stock. The emulsified wax component may be other than paraffin wax, for instance, one of the amorphous waxes or thermoplastic hydrocarbon materials available as a by-product in the petroleum industry. The term "wax" as used herein is hence to be understood as meaning any one of such waxes or thermoplastic hydrocarbon materials. Because the aqueous wax compositions hereof are stabilized substantially only by stabilizers or protective colloids practically inert to and non-precipitable by alum, it is possible to develop in papers and boards sized therewith a water-repellent quality superior to that realized in papers or boards sized with other emulsified wax compositions and more especially wax emulsions in which soap stabilizers are employed. While water-soluble gums, such as gum arabic, tragacanth, acacia or the like, may be used as the stabilizers for the emulsified wax compositions hereof, it is possible to use such other stabilizers or protective colloids as are practically inert to and non-precipitable by alum, including, for example, the substantially neutral salts of sulphonic acid (e. g., those available on the market under the trade-marks "Daxad" and "Dipex"), also animal glue, colloidal clay, etc.

Various other changes or modifications are possible in such particular embodiment of the invention as has hereinbefore been described while benefiting by the combined features or principles of the present invention as defined by the appended claims.

We claim:

1. An aqueous sizing composition adapted to be added subsequently to papermaking stock comprising an aqueous wax emulsion stabilized substantially only by a water-soluble gum and containing therein alum and precipitated basic aluminum sulphate.

2. A method of preparing an aqueous sizing composition adapted to be added subsequently to papermaking stock, which comprises emulsifying wax in water containing a stabilizer substantially inert with respect to alum; admixing with the resulting emulsion alum and less than a chemically equivalent proportion of a water-soluble salt capable of undergoing reaction with the alum to precipitate a water-insoluble aluminum salt; and precipitating said water-insoluble salt while said wax is maintained in emulsified state.

3. A method of preparing an aqueous sizing composition adapted to be added subsequently to papermaking stock, which comprises emulsifying wax in water containing a stabilizer substantially inert with respect to alum; admixing with the resulting emulsion alum and less than a chemically equivalent proportion of sodium aluminate; and precipitating basic aluminum sulphate while said wax is maintained in emulsified state.

RALPH W. KUMLER.
HAROLD SINCLAIR.